(12) United States Patent
Serkh (10) Patent No.: US 6,582,332 B2
(45) Date of Patent: Jun. 24, 2003

(54) DAMPING MECHANISM FOR A TENSIONER (75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 45 days.

(21) Appl. No.: 09/861,338

(22) Filed: May 18, 2001

(65) Prior Publication Data

US 2002/0010045 A1 Jan. 24, 2002

Related U.S. Application Data (63) Continuation-in-part of application No. 09/482,128, filed on Jan. 12, 2000.

(51) Int. Cl.[7] .............................. F16H 7/12; F16H 7/22
(52) U.S. Cl. ..................... 474/135; 474/109; 474/133
(58) Field of Search ....................... 474/135, 133, 474/134, 137, 101, 109–111, 112, 113–117

(56) References Cited

U.S. PATENT DOCUMENTS

| | | | | |
|---|---|---|---|---|
| 4,696,663 A | * | 9/1987 | Thomey et al. | 474/133 |
| 5,030,171 A | * | 7/1991 | Henderson | 474/135 |
| 5,277,667 A | * | 1/1994 | Gardner et al. | 474/135 |
| 5,496,221 A | * | 3/1996 | Gardner et al. | 474/135 |
| 5,545,095 A | * | 8/1996 | Henderson | 474/135 |
| 5,632,697 A | | 5/1997 | Serkh | 474/109 |
| 5,647,813 A | | 7/1997 | Serkh | 474/135 |
| 5,803,850 A | * | 9/1998 | Hong et al. | 474/109 |
| 5,919,107 A | * | 7/1999 | Stepniak | 474/135 |

FOREIGN PATENT DOCUMENTS

| | | |
|---|---|---|
| DE | G 92 09 454.6 | 9/1992 |
| DE | 19623 485 A1 | 12/1996 |

\* cited by examiner

*Primary Examiner*—Marcus Charles
(74) *Attorney, Agent, or Firm*—J. A. Thurnau, Esq.; C. H. Castleman, Esq.; S. G. Austin, Esq.

(57) ABSTRACT

A damping mechanism used in a tensioner for tensioning a power transmission belt including a damping plate having a friction surface, at least one ramp surface and first and second contact points for operatively connecting a spring whereby the spring torque applied to damping mechanism in combination with a reactive force at the pivot surface generates a normal force.

22 Claims, 11 Drawing Sheets

DAMPING MECHANISM FOR A TENSIONER

REFERENCE TO RELATED APPLICATIONS

This application is a continuation-in-part from U.S. application Ser. No. 09/482,128 filed Jan. 12, 2000.

FIELD OF THE INVENTION

The invention relates to a tensioner with a damping mechanism and a belt drive system that includes such a tensioner. More particulary, the invention relates to a tensioner with a spring that biases the position of a pivot-arm to which a belt engaging pulley is rotatably mounted. The tensioner of the invention with its damping mechanism is particularly useful in controlling tension of a micro-V belt drive system such as a front end accessory drive for automotive engine applications.

BACKGROUND OF THE INVENTION

A mechanical tensioner is used to automatically control tension of a micro-V belt of a front end accessory drive for automotive engine applications. Usually, such a tensioner has a pivot-arm that rotates about a pivot secured to a base and uses a sleeve type bushing on the pivot to provide a bearing surface for the rotating pivot-arm. Many of such bearings are made of plastic and are subject to wear over the expected life of the tensioner. A torsion spring is often used with one end connected to the base and another end connected to the pivot-arm to bias the position of the pivot-arm and position an attached pulley against a belt. The spring is also used to generate a spring force operative with a damping mechanism that generates a normal force component to a friction sliding surface to inhibit or dampen oscillatory movements of the pivot-arm.

DESCRIPTION OF RELATED ART

A common tensioner design solving bulk, cost and damping problems is disclosed in U.S. Pat. No. 4,473,362. The '362 tensioner has a pivot-arm attached to an off-set cylindrical member that supports the pivot-arm and rotates about a pivot secured to a base. Only one torsion spring is used with one end connected to the pivot-arm and the other end connected to the base. A single sleeve-type bushing on the pivot has a bearing surface that supports the cylindrical member. The radial plane of a pulley bearing is off-set in relation to the sleeve-type bushing which introduces a moment or couple as a load which must be carried by the bushing. Such tensioners are referred to as "Zed" type tensioners because of the off-set of the pulley relative to its support.

The belt of a drive system utilizing such Zed type tensioners engages the pulley and generates a belt force at the pulley which is transmitted to the cylindrical member. As explained in the '362 patent, the unequal loads to the bushing are reduced by a damping means that generates a normal force component acting in generally the same direction as the belt force component. In some cases, the normal force component of the damping means is not sufficient to balance against a moment generated by the belt force being off-set, as such the single bushing has a tendency to wear unevenly and prematurely.

A damping mechanism typically used in such "Zed" type tensioners is disclosed in U.S. Pat. No. 5,632,697. The '697 damping mechanism includes a damping means where the normal force generated by the damping means is greater than the spring force component activating the damping mechanism. The damping means has a brake shoe with an outer arcuate friction surface that engages the inside of a second cylindrical member to provide friction surface sliding therewith. The brake shoe has two oppositely facing inside ramp surfaces where one of the ramp surfaces slideably engages a complimentary ramp surface of the base and the other ramp surface slideably engages an extension of the spring end which applies the spring force to the brake shoe. The spring force is generated by an end of the spring bending around a proturbance formed in the base. The spring under torsion applies a spring force substantially normal to the inside ramp surface pressing ramp surface of the shoe against the complimentary ramp surface of the base and pressing a lining against a the compliementary inside surface of the second cylindrical member thereby causing a reactionary force to be imparted to the shoe.

Since the '697 damping mechanism requires the use of multiple ramp surfaces, the brake shoe and a proturbance in the base the ability to achieve greater damping is limited. In addition, the use of multiple parts increases the cost, weight and size of the overall tensioner design.

SUMMARY OF THE INVENTION

In accordance with the invention, a damping mechanism is provided that is particularly useful in micro-V belt front end accessory drive systems utilizing a tensioner in automotive applications where the pulley alignment over the expected life of the tensioner is important and the overall cost, weight and size of the tensioner is important. The damping mechanism of the invention includes a spring having first and second ends with the first end operatively connected to a damping plate having first and second spring contact points whereby the spring torque applied to the damping plate in combination with a reactive force at the pivot surface generates a normal force. The damping plate also includes an outer friction surface and at least one ramp surface. In one embodiment of the invention the second end of the spring is connected to a tensioner base. In another embodiment of the invention the second end of the spring is connected to a tensioner pivot-arm.

An advantage of the invention is that a reduced bulk damping mechanism is provided having a reduced number of component parts and an increased area of friction contact. Another advantage of the invention is provided by reducing the need for expensive machined proturbances and ramp surfaces in either the base or the pivot-arm.

These and other advantages of the invention will be apparent after reviewing the drawings and description thereof wherein;

DESCRIPTION OF THE PREFERRED EMBODIMENTS

Figure 1:
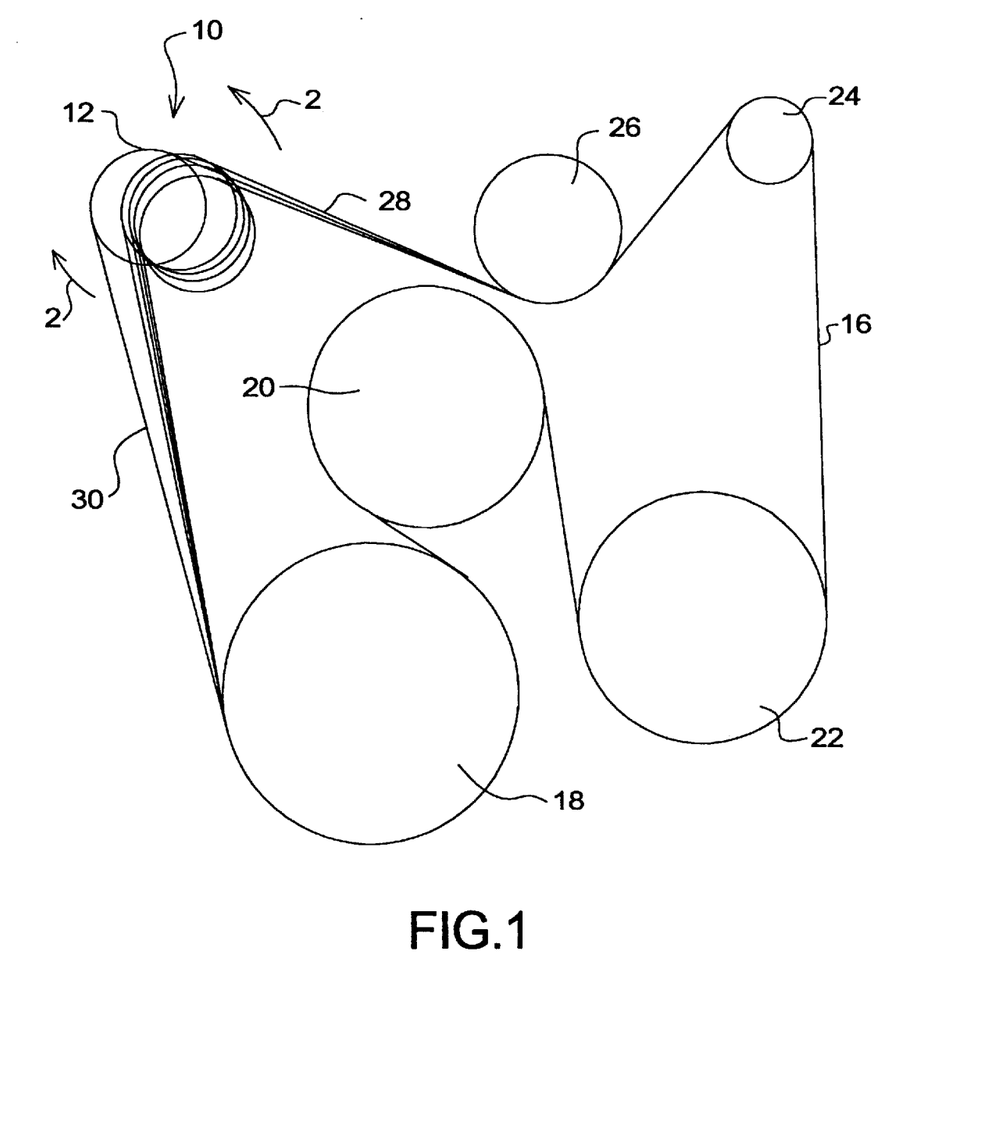
FIG. 1 is a front view schematic of a front end accessory drive system that includes a belt tensioner having a damping mechanism of the invention.
Figure 2:
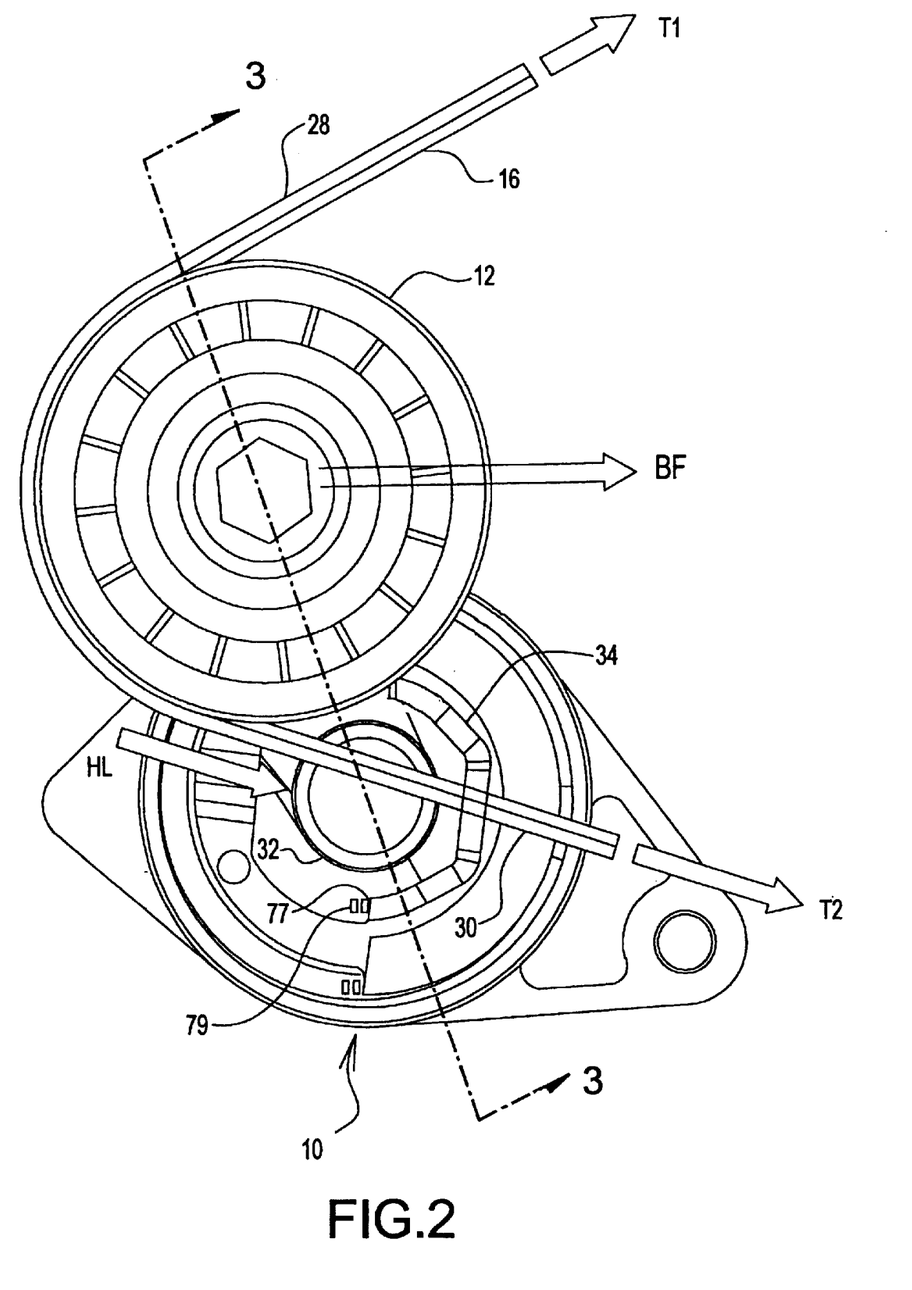
FIG. 2 is an enlarged partial schematic view taken generally at line 2—2 of FIG. 1 illustrating various component forces associated with the tensioner.

Referring to FIGS. 1 and 2, a tensioner 10 with a pulley 12 is illustrated as a component part of a belt drive system that includes a belt 16 and several pulleys. By way of example, the belt 16 is entrained around a crank pulley 18, a fan/water pump pulley 20, a power steering pulley 22, an alternator pulley 24, an idler pulley 26, and the tensioner pulley 12. The tensioner pulley 12 engages the belt 16 and is shown in several positions to schematically show how the pulley moves to adjust belt tension. The tensioner pulley 12 engages the belt 16 and receives a belt load in the form of belt tension T1, T2, of adjacent belt spans 28, 30. The belt tension T1, T2 (or load) combine to generate a belt force component BF along a bisector or an angle formed between the belt spans 28, 30. The belt force component being axially off-set from a pivot 32 of the tensioner, generates a complicated hub load including forces and moments that are symbolically (i.e. not specifically) represented by the arrow HL. The damping mechanism of the invention is shown at 34 in the tensioner 10.

Figure 3:
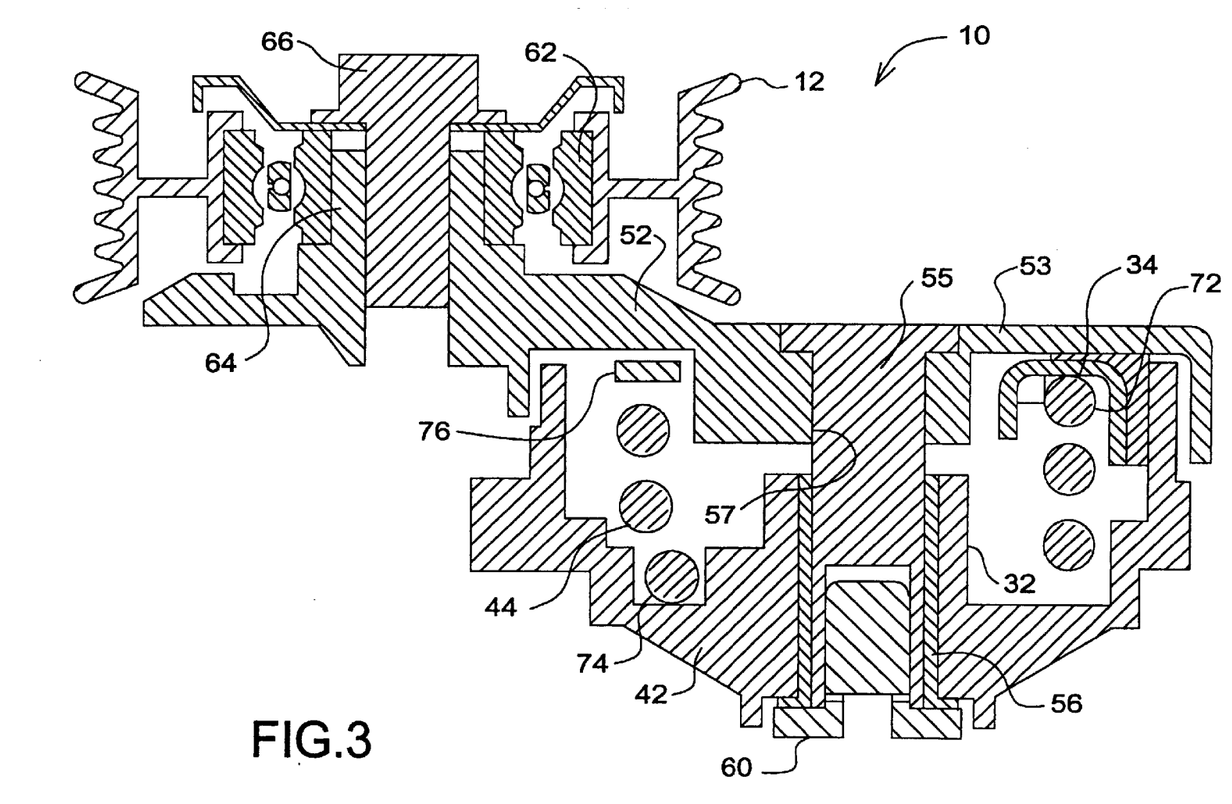
FIG. 3 is a cross-sectional view taken along the line 3—3 of FIG. 2.

Referring the FIG. 3, the tensioner 10 is of the mechanical type including the damping mechanism 34 of the invention includes a base 42, a torsion spring 44 and a pulley 12 rotatably mounted to a pivot-arm 52 such as by means of a ball bearing 62 on a shaft 64. The ball bearing 62 is retained on the shaft 64 by a flanged fastener 66. The pivot-arm 52 is attached to a cylindrical member 53 that supports the pivot-arm 52 and rotates with a pivot shaft 55. At least one sleeve type bushing 56 is positioned in the pivot 32. The pivot bushing 56 is preferably of the polymeric type and positioned in the pivot for rotating against the pivot shaft 55 to thereby support the pivot-arm 52. While one pivot bushing 56 is represented, it is possible to have more than one pivot bushing. The pivot shaft 55 including a fastener 60, extends through a flanged bore 57 in the cylindrical member 53 and the pivot bushing 56 to thereby attach the pivot-arm 52 to the base 42.

Figure 4:
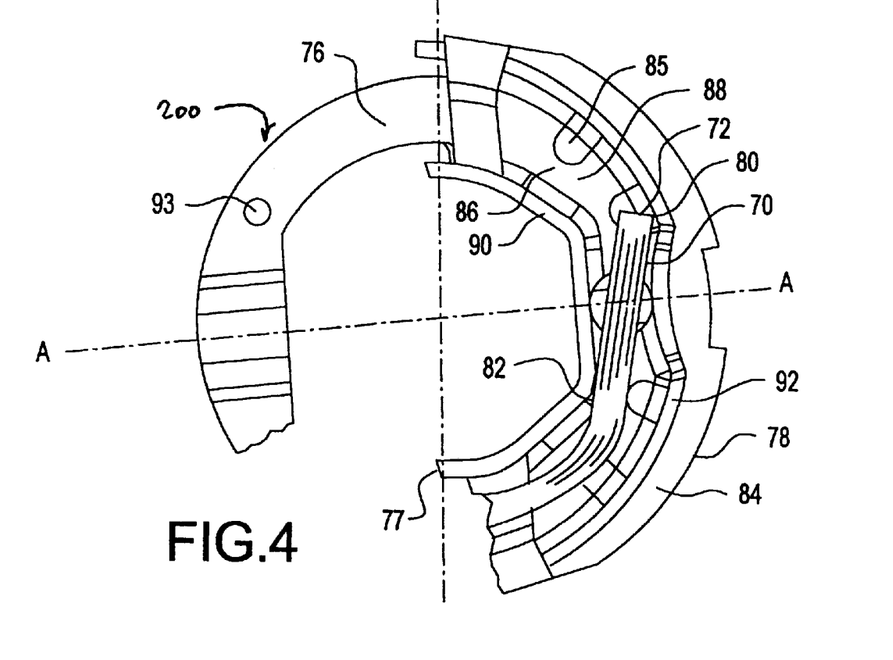
FIG. 4 is an enlarged view showing the damping mechanism of the invention.

Referring to FIGS. 2–4 the damping mechanism 34 includes a torsion spring 70 having first 72 and second 74 ends. The damping mechanism 34 further includes a damping plate 76 having an outer friction surface 78 for engagement in this embodiment with the base 42 of the tensioner 10. A ramp surface 77 is provided for mating engagement with a proturbance 79 of the pivot-arm 52. The damping plate 76 includes first 80 and second 82 spring contact points for operatively connecting the spring 70 to the damping plate 76. In the embodiment shown in FIG. 4, the damping plate 76 is symmetrical about the A—A axis thereby allowing installation of the spring 70 having a different spring coil wind direction.

The damping plate includes a channel 86 for receiving the spring 70 having a plate base 88, an inner wall 90 and an outer wall 92. The plate base includes friction pads 93 periodically spaced on a bottom surface 200 for sliding engagement with the tensioner cylindrical member 53.

The damping plate 76 includes an attached lining 84 that defines the friction surface 78 and is attached to the damping plate 76 by the use of mechanical tabs 85 for fixedly adhering the lining 84 thereto.

Figure 5:
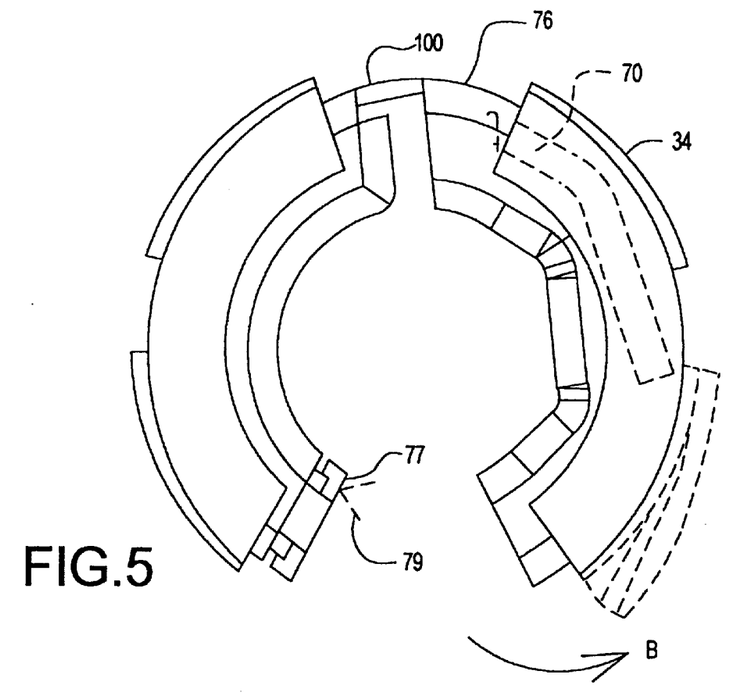
FIG. 5 is an alternative embodiment of the damping mechanism having a semi-circular shape.

The damping mechanism 34 as shown in FIGS. 2–4 is shaped circular. Another embodiment of the damping mechanism 34 is shown in FIG. 5 where the damping plate is semi-circular. The damping plate 76 includes a pivot joint 100 allowing the damping plate 76 under torque from the spring 70 to have relative motion indicated by B. The additional movement of the damping plate 76 provides increased friction force for damping.

Figure 6:
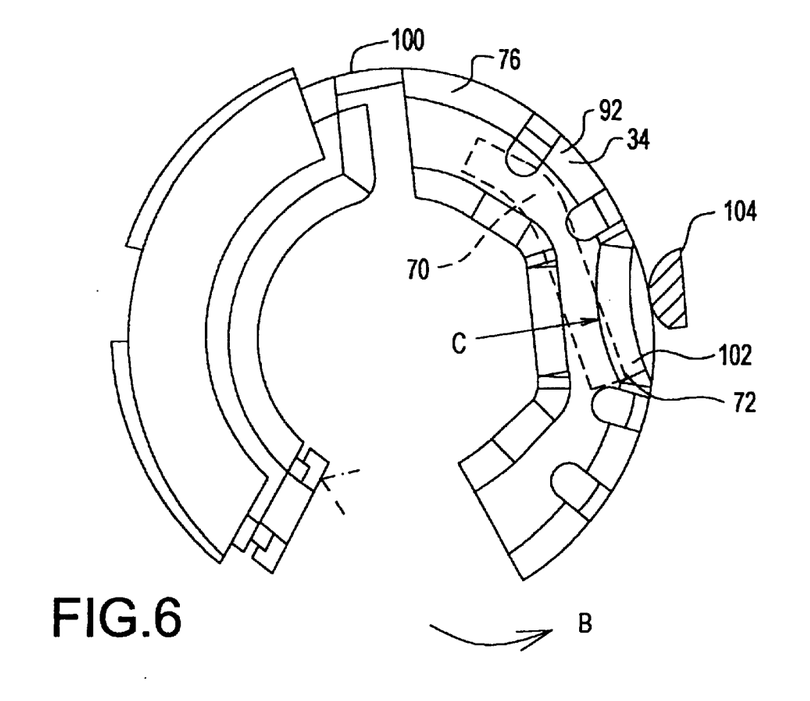
FIG. 6 is an alternative embodiment of the damping mechanism having a semi-circular shape and an outer wall having a deflecting band.

In another embodiment shown in FIG. 6, a semi-circular damping plate 76 is provided including a deflecting band 102 on the outer wall 92. In this embodiment, the force applied by spring end 72 acts upon the deflecting band 102 as shown in C, for allowing radial engagement with the tensioner in order to assist in loading the pivot-arm 52. In this embodiment, the deflecting band 102 has contact with additional support 104 attached to the tensioner arm 52.

Figure 7:
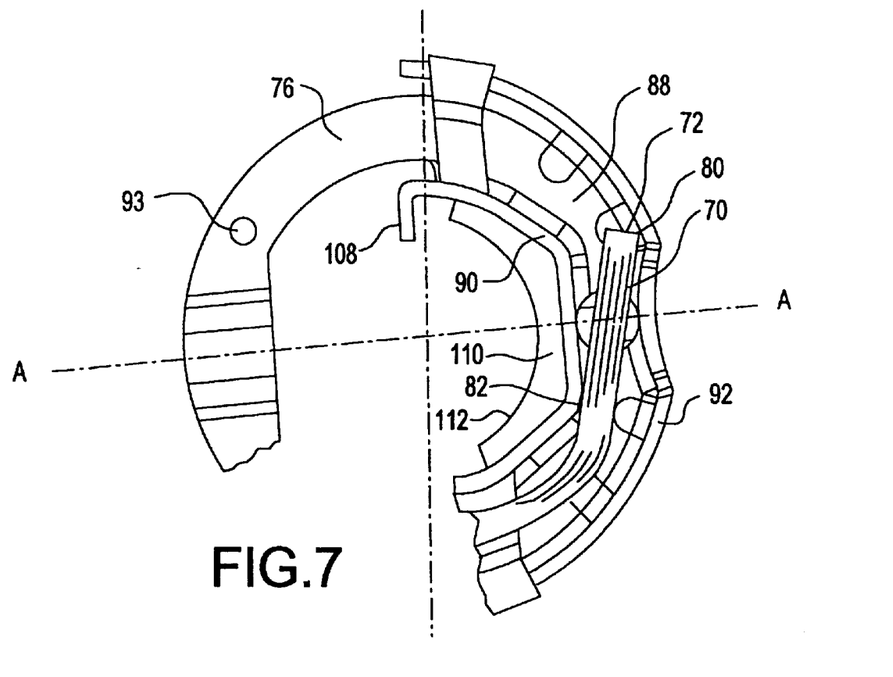
FIG. 7 is an alternative embodiment of the damping mechanism having an inner friction surface.

FIG. 7 shows another embodiment of the damping mechanism including the inner wall 90 having a lining 110 including an inner friction surface 112.

Figure 8:
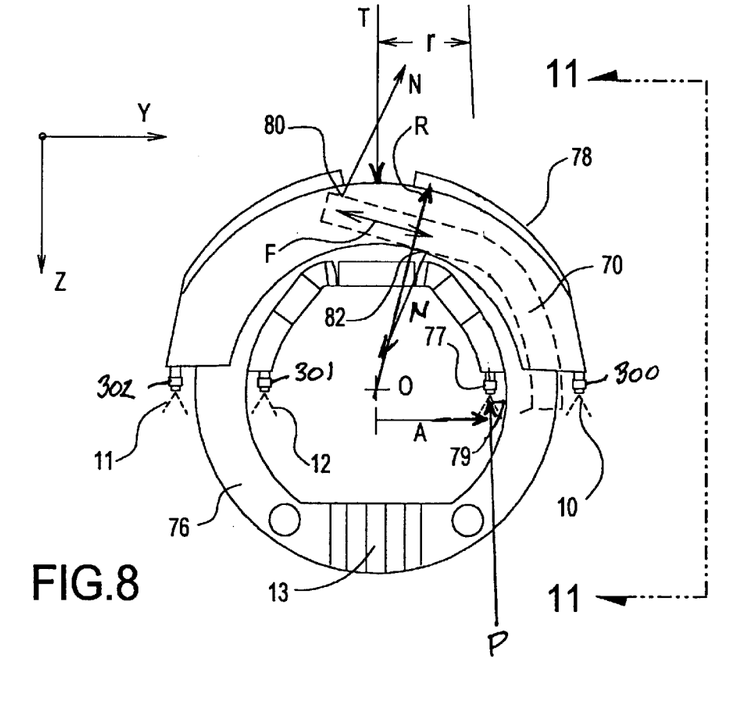
FIG. 8. depicts a bottom view of the forces acting on the damping plate.

Reference is made to FIG. 8. which depicts a bottom view of the forces acting on the damping plate. The damping characteristic of the tensioner using the inventive damping plate, also referred to as damping mechanism, is asymmetric. This is best described in terms of the forces operating on the damping mechanism or plate, that is, a first damping force $T_L$ acts on a movement of the pivot arm in a first direction away from an endless member and a second damping force $T_{un}$ acts on a movement of the pivot arm in a second direction toward an endless member, the first damping force being greater than the second damping force.

In the stationary position a biasing member or torsion spring with spring torque, $T_{spr}$, creates reactions N and N on first and second contact points 80, 82. The other end of the spring engages the base 42 which is constrained from rotation, resulting in a torque. The damping mechanism is substantially maintained in a predetermined position relative to the pivot arm between ramp surface 77 and contact point 79 and friction surface 78. Further, ramp surface 300 engages contact point 10 for lower damping force. In the case of opposite movement, ramp surface 302 engages contact point 11 for lower damping force and ramp surface 310 engages contact point 12 for higher damping force.

The damping band also engages a base inner arcuate surface. As the pivot arm 52 moves, the damping plate friction surface bears on the base inner arcuate surface creating a first and second damping force opposing a pivot arm 52 movement, thereby damping oscillatory movements of the pivot arm in each direction. The damping plate damping forces oppose movement of the pivot arm in either direction.

The analysis is;

$$T_{spr} = N*F \quad (1)$$

F is the distance between contact points 80, 82. The damping plate ramp surface 77 bears on the pivot arm at stop or contact point 79, which controls a rotation of the damping plate 76 about a protruberance or pivot point 79.

In particular, when the base 42 is stationary and the pivot arm 52 rotates clockwise with the damping mechanism, friction torque or damping force created on the surface of curvilinear friction surface 78 increases a reaction force P at point 79, where:

$$P = T_{spr}/A \quad (2)$$

A is the radial distance from the center of rotation O to P on the damping mechanism. O is the center of rotation of the pivot arm 52.

Figure 9:
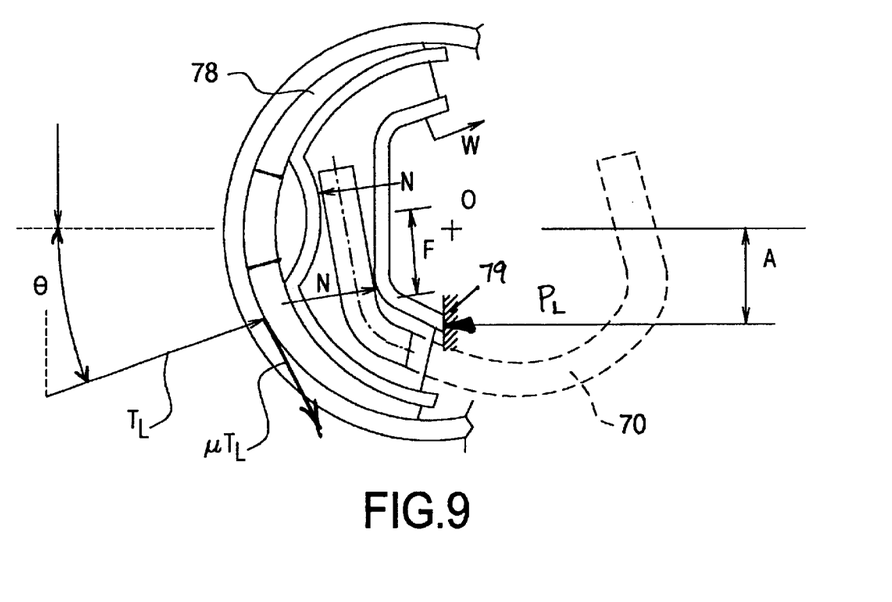
FIG. 9 is a top view of the damping plate.

Referring to FIG. 9, a top view of the damping plate, the torque equation for torque relative to point O is:

$$T_{spr} - P_L*A + \mu T_L*R = 0 \quad (3)$$

Where $T_L$ and $P_L$ are each a loading force created by a belt tension or force. $\mu$ is the coefficient of friction of the surface of friction surface 78. Each portion of friction surface 78 described herein may comprise any frictional material applicable to damping a relative movement of adjacent sliding surfaces known in the art, including but not limited to nylon 6, nylon 66 and Teflon®. R is a radius of friction surface 78.

Continuing, the forces in the x direction are:

$$T_L*\cos\theta + \mu T_L \sin\theta - P_L = 0 \quad (4)$$

Then:

$$T_L = P_L[1/(\cos\theta + \mu \sin\theta)] \quad (5)$$

Replacing $T_L$ and $P_L$ in the torque equation (3) results in:

$$T_{spr} - P_L*A + \mu*P_L[1/(\cos\theta + \mu \sin\theta)]*R = 0 \quad (6)$$

Factoring the equation gives:

$$P_L = T_{spr}/A * [(\cos\theta + \mu \sin\theta)/((\cos\theta + \mu\sin\theta) - \mu*R/A)] \quad (7)$$

Equation (7) gives the value of the loading force $P_L$ exerted at contact point 79 on damping plate ramp surface 77 during a loading cycle, see FIG. 8.

Figure 10:
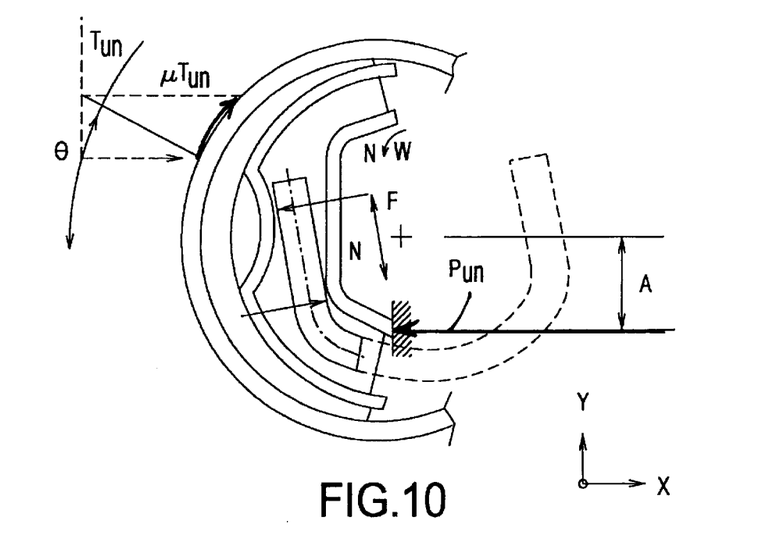
FIG. 10 is a free body diagram of the damping mechanism in a tensioner base.

Referring to FIG. 10, a free body diagram of the damping mechanism in an unloading direction, and following the same logic described in FIG. 9, when the tensioner arm moves counterclockwise or "unloads", friction torque reduces reaction $P_{un}$.

Reaction $P_L/P_{un}$ develops a damping force on friction surface $T_L/T_{un}$. A greater P creates a higher normal reaction T and correspondingly higher friction torque and vice versa.

$$P_{un} = T_{spr}/A*[(\cos\theta - \mu \sin\theta)/((\cos\theta - \mu \sin\theta) + \mu*R/A)] \quad (8)$$

Equation (8) gives the value of the force $P_{un}$ exerted at point 79 on damping plate 76 during an unloading cycle, see FIG. 8.

Damping asymmetry, and related coefficient of asymmetry, is determined by the belt tension or P load difference between the loading and unloading condition which correspond to a first damping force and second damping force.

$$K_{AS} = \Delta T_{Belt\ Loading}/\Delta T_{Belt\ Unloading} \quad (9)$$

Where:

$K_{AS}$ is the coefficient of asymmetry.

$\Delta T_{Belt\ Loading}$ is the change in belt tension with corresponding first damping force when the pivot arm moves away from a belt or endless member.

$$\Delta T_{Belt\ Loading} = T_{max\ belt} - T_{belt\ nom.} \quad (10)$$

$\Delta T_{Belt\ Unloading}$ is the change in belt tension with second damping force when the pivot arm moves toward a belt.

$$\Delta T_{Belt\ Unloading} = T_{belt\ nom.} - T_{belt\ min} \quad (11)$$

In the tensioner design, reaction force P delivers the belt tension. Therefore, $$K_{AS} = (P_L - P)/(P - P_{un}) \quad (12)$$

Upon substituting, the equation for the coefficient of asymmetry is:

$$K_{AS} = [(\cos\theta - \mu \sin\theta + \mu*R/A)/(\cos\theta + \mu \sin\theta - \mu*R/A)] \quad (13)$$

Where $\theta = \arctan(\mu)$.

Example Case.

Assuming the following values for the noted variables:

$\mu = 0.2$, coefficient of friction

R = 33 mm

A = 16 mm $\theta = 11.3°$ and applying the foregoing equations gives:

$$K_{AS} = 1.35/0.61 = 2.2$$

The coefficient of asymmetry can be tuned by varying the coefficient of friction of the friction surface 78 as well as by varying the dimensional variables R and A.

In the case of a damping mechanism having a double damping band, the asymmetry will be 1.5 to 2 times greater than for a single damping band, based upon the logic described herein.

Diagram 1 and Diagram 2 depict tensioner load and damping measured statically and dynamically for a single damping mechanism.

Diagram 1.

Diagram 2.

Figures 13, 14, 15, 16:
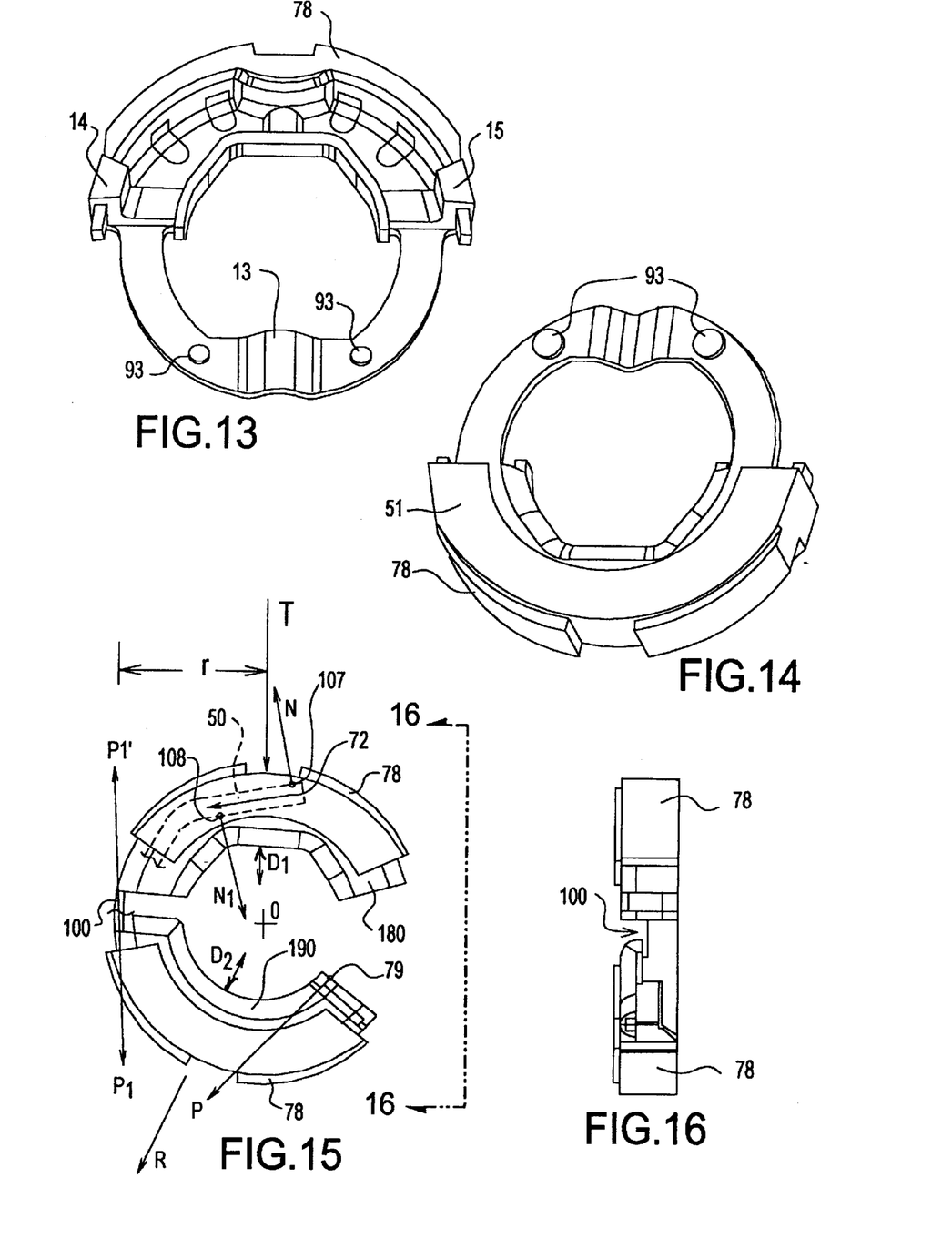
FIG. 13 is a top perspective view of the damping plate.
FIG. 14 is a bottom perspective view of the damping plate.
FIG. 15 is a bottom plan of a first alternate embodiment of the damping mechanism.
FIG. 16 is a side elevation view of the damping mechanism along line 16—16 in FIG. 15.

Diagram 3 and Diagram 4 depict tensioner load and damping measured statically and dynamically for a double damping mechanism, see FIG. 15.

Diagram 3.

Diagram 4.

In each of the foregoing diagrams the asymmetric characteristic is depicted by the spread between the $T_{load}$ point and the T point versus the spread between the $T_{unload}$ point and the T point. Determination of the value of KAS is a simple matter of measuring the values on each graph. Each is as follows:

| For Diagram 1: | 24 | 200 | 400 |
|---|---|---|---|
| $T_{load} - T =$ | 10 | 8 | 10 |
| $T - T_{unload} =$ | 6 | 6 | 6 |
| $K_{AS} =$ | 1.66 | 1.33 | 1.66 |
| For Diagram 2: | | | |
| $T_{load} - T =$ | 12 | 9 | 10 |
| $T - T_{unload} =$ | 7 | 6 | 6 |
| $K_{AS} =$ | 1.71 | 1.5 | 1.66 |
| For Diagram 3: | | | |
| $T_{load} - T =$ | 22 | | |
| $T - T_{unload} =$ | 11 | | |
| $K_{AS} =$ | 2.00 | | |
| For Diagram 4: | | | |
| $T_{load} - T =$ | 24 | | |
| $T - T_{unload} =$ | 11 | | |
| $K_{AS} =$ | 2.18 | | |

Figure 11:
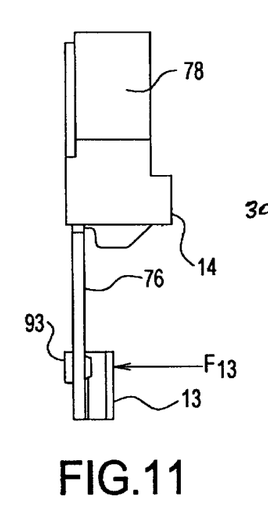
FIG. 11 is a side view of the damping mechanism along line 11—11 in FIG. 8.

FIG. 11 is a side view of the damping mechanism along line 11—11 in FIG. 8. Guide 14 is provided for properly positioning the spring relative to damping plate 76. Spring support 13 protrudes above the damping plate 76. The spring is installed in compression with an axial load that operates parallel to an axis of rotation of the pivot arm, exerting force $F_{13}$ upon spring support 13, as well as guide 14 and 15. This presses the damping plate 76 against a pivot arm, not shown, see FIG. 2.

Figure 12:
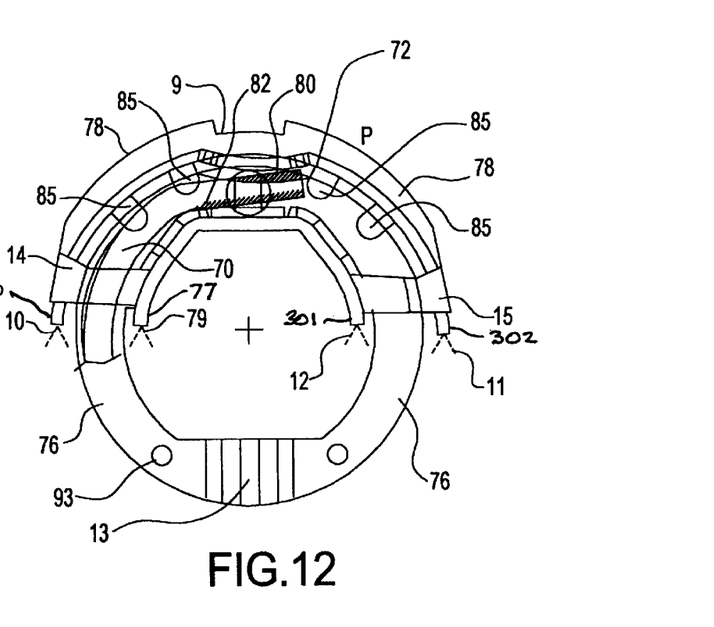
FIG. 12 is a top plan view of the damping mechanism.

Friction surface 78 is affixed to damping plate 76 by tabs 85, see FIG. 12. Friction pads 93 provide a low friction surface by which damping plate 76 slidingly engages a pivot arm, not shown, see FIG. 2.

FIG. 12 is a top plan view of the damping mechanism. Tabs 85 interlock with damping plate 76 to affix friction surface 78 to damping plate 76. An end 72 of spring 70 contacts damping plate 76 at contact points 80, 82. Groove 9 bifurcates friction surface 78 into two symmetric halves, each half engaging a tensioner base inner arcuate surface (not shown). Groove 9 is substantially aligned with contact points 80, 82 for reasons described herein.

In operation with a movement in a clockwise direction, and in the case with a reduced belt or hubload, force P is relatively low. Hubload is the load exerted on the pulley pivot point 32 resulting from the force exerted on the pivot arm by a belt. Contact point 79 operates to constrain the travel of damping plate 76 in the relatively lightly loaded condition. In the case of increased hubloads, damping frame 76 bears on contact point 10 and contact point 79 in the more heavily loaded condition. This is the result of slight plastic deformation of the damping plate and friction surface under increased load.

In the case of a counterclockwise movement of a tensioner arm, contact point 12 operates to constrain travel of damping plate 76 in the relatively lightly loaded condition. In the case of greater hubloads, contact point 11 operates in conjunction with contact point 12 in the more heavily loaded condition. Again, this is the result of slight plastic deformation of the damping plate under load.

In either case, contact of the damping plate with contact point 79 or 10 causes the damping plate to rotate having a center of rotation at point 79 or 10 depending on the magnitude of the spring torque being applied. That is, referring to FIG. 8, operation of forces at 80, 82 will cause damping plate 76 to engage point 79 and perhaps 10, depending on the load. Once so engaged damping plate 76 will rotate slightly about point 79 or 10 thereby bringing friction surface 78 into substantial contact with an inner surface of the housing, thereby exerting a normal force on the frictional surface. This logic also applies to engagement of the damping plate with contact points 11,12.

As one skilled in the art can appreciate, controlling the frame and travel and direction of rotation between pivot arm points 79, 10, 11, and 12 enhances the engagement between the friction surface 78 and the inner surface of the housing. The pivot arm may rotate through its entire operational angular range of motion with respect to the housing since the damping plate is captive to the arm between the contact points 79,10,11, 12.

FIG. 13 is a top perspective view of the damping plate. Friction pads 93 are attached to damping plate 76 to reduce friction between damping plate 76 and a pivot arm (not shown). One will note that the damping plate is not axially affixed for substantially controlled rotation about point O. Damping plate 76 floats between points 79, 10, 11, and 12 under the spring during operation. This allows each friction surface to properly orient under load so as to fully engage the base inner arcuate surface during operation. This also allows the friction surface to accommodate wear by constantly reorienting during the life of the tensioner. Guides 14 and 15 properly position and support the spring end 72 within the damping plate 76. This relationship is necessary for proper placement of spring end 72 in contact with damping plate points 7, 8.

FIG. 14 is a bottom perspective view of the damping plate. The bearing surfaces of pads 93 are at substantially coplanar with lower surface 51 of friction surface 78, thereby maintaining the damping plate substantially flat upon the pivot arm. Surface 51 has the same coefficient of friction as friction surface 78.

FIG. 15 is a bottom plan of a first alternate embodiment of the damping mechanism. The first alternate embodiment comprises two friction surfaces 78 on damping plate 76. Opposing forces $P_1$ and $P_1'$ act on the damping plate at pivot joint 100. Spring end 72 contacts damping plate 76 at contact points 107 and 108. In operation, spring 50 generates force:

$$P_1' = T_{spr}/r$$

Pivot joint 100, see FIG. 16, allows the damping plate to flex slightly, thereby allowing both parts of the damping plate, 180 and 190, to move relative to each other. The relative movement of frame parts 180 and 190 due to the flexing of the damping plate at pivot joint 100 is radial in relation to a center of rotation O of damping plate 76. Therefore, each friction surface 78 is moveable in direction D1 and D2 respectively.

When the damping plate is in equilibrium, force $P_1'$ provides opposite and equal force $P_1$ to the other parts of damping plate 76, i.e., 180 and 190. Forces $P_1$ and P add creating resultant R:

$$R = P_1 + P \tag{14}$$

Resultant operates on the inner arcuate surface of tensioner base, not shown, see FIG. 2. Forces R and T operate at the interface between the tensioner base inner arcuate surface and the friction surface. These forces, in conjunction with the coefficient of friction, generate a frictional force at each of the friction surfaces.

In the equilibrium condition, force P is a balancing force acting to oppose, or balance, a belt load moment arm:

$$B_L * M = P * A \tag{15}$$

Or;

$$P = (B_L * M)/A \tag{16}$$

Where $B_L$ is a belt or hubload, M is the moment arm measured from the center of rotation O to the hubload on the arm, and P and A are as described herein.

The friction force, $(R+T)\mu$, is approximately 3 times larger than the friction force on a single damping mechanism due to additional force; $R = P + P_1$. P is the only force balancing the arm against a hubload.

FIG. 16 is a side elevation view of the damping mechanism along line 16—16 in FIG. 15. It shows the relative positions of friction surfaces 78. Pivot joint 100 is depicted between the friction surfaces. Friction surfaces 78 each have equal arcuate engaging lengths $A_L$, see FIG. 17, and have the same coefficient of friction, $\mu$. Of course, the damping characteristic of the damping mechanism may be changed in part by varying the length $A_L$ of each of the friction surfaces.

Figure 17:
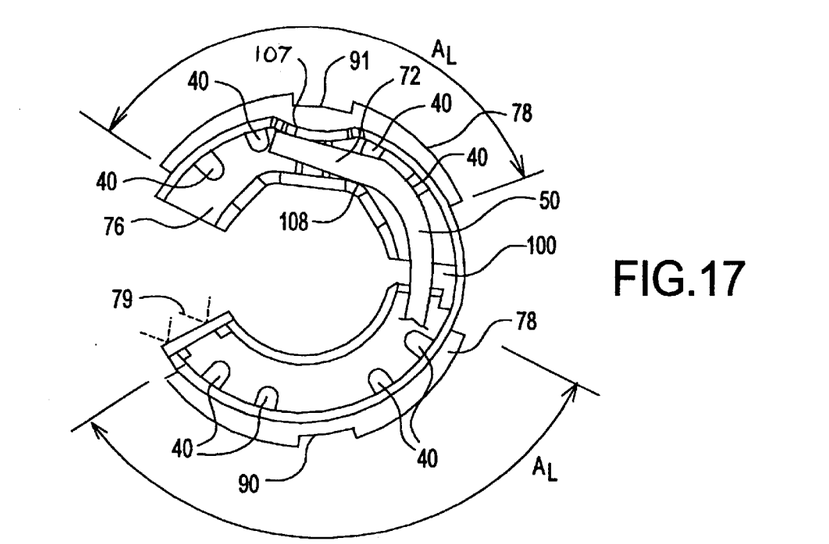
FIG. 17 is a top plan view of the first alternate damping mechanism.

FIG. 17 is a top plan view of the first alternate damping mechanism. Tabs 40 connect friction surfaces 78 to the damping plate 76. Spring end 72 contacts damping plate 76 at contact points 107 and 108. Pivot joint 100 allows damping plate 76 to flex, thereby allowing relative movement of friction surfaces 78 as described elsewhere is this specification.

Figure 18:
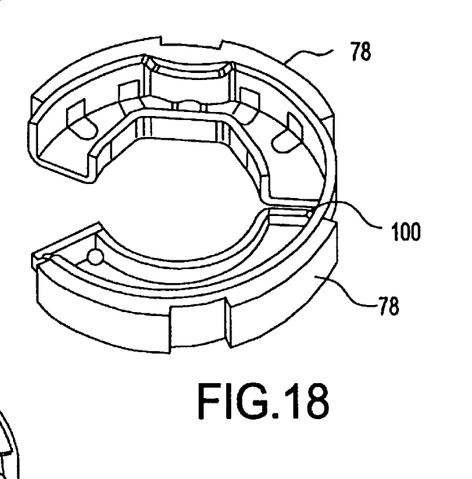
FIG. 18 is a top perspective view of the first alternate damping mechanism.

FIG. 18 is a top perspective view of the first alternate damping mechanism. Pivot joint 100 is shown between friction surfaces 78.

Figure 19:
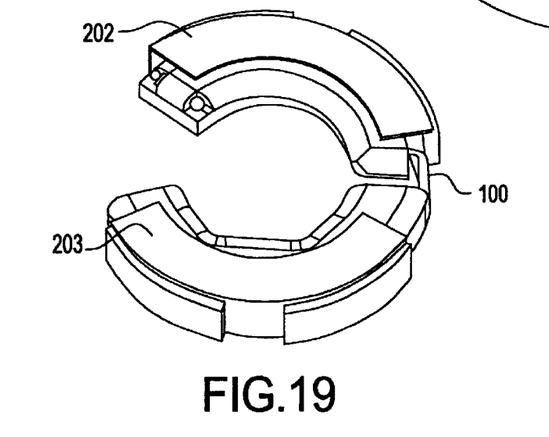
FIG. 19 is a bottom perspective view of the first alternate damping mechanism.

FIG. 19 is a bottom perspective view of the first alternate damping mechanism. Surfaces 202 and 203 engage a pivot arm (not shown). Surfaces 202 and 203 may have the same coefficient of friction as the friction surfaces if required by a user. In this embodiment, pads 93 used in the single friction surface embodiment, see FIG. 13, are not needed.

Figure 20:
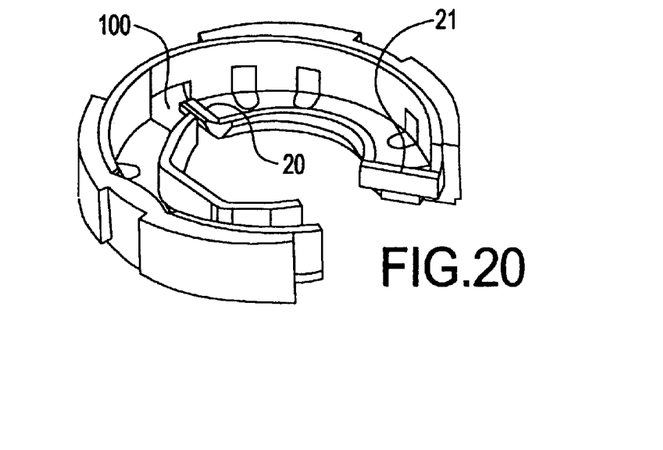
FIG. 20 is a top perspective view of an alternate damping mechanism.

FIG. 20 is a top perspective view of an alternate damping mechanism. Spring supports 20, 21 are of unequal height to properly support a helical coil of a torsional spring (not shown). In operation, the spring is slightly axially compressed; thereby causing a force to be exerted upon damping surfaces 202 and 203 through spring supports 20 and 21. Supports 20, 21 serve to distribute an axial spring force evenly about the damping plate.

Figure 21:
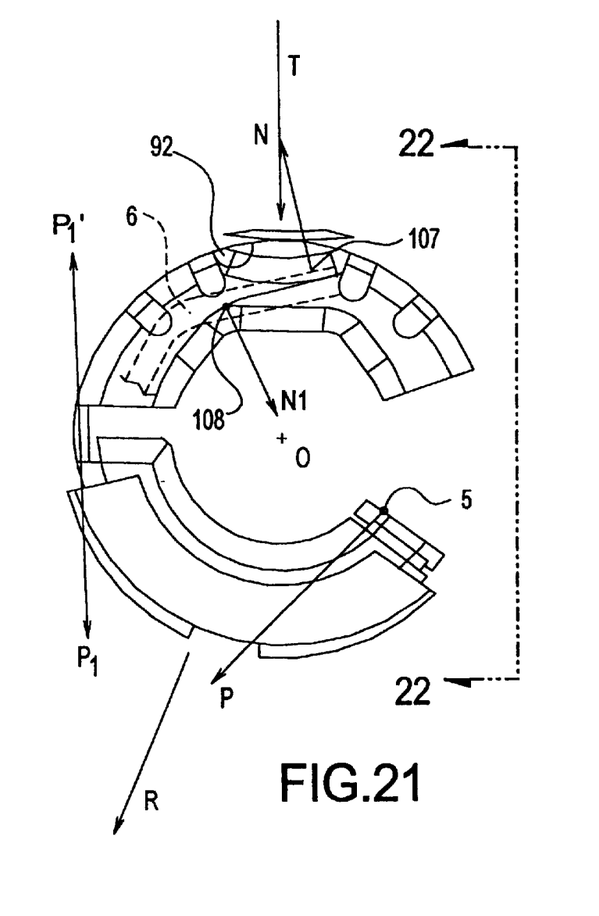
FIG. 21 is a bottom plan view of a second alternate embodiment.
Figures 23, 24:
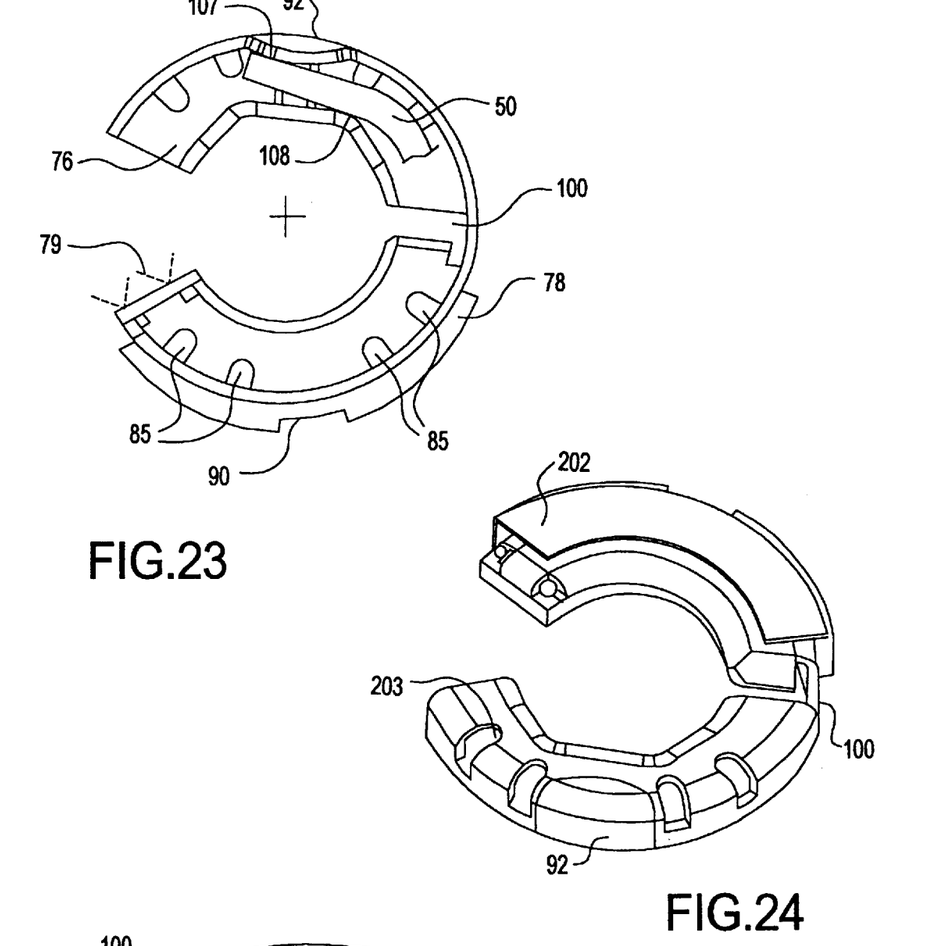
FIG. 23 is a top plan view of the second alternate embodiment.
FIG. 24 is a bottom perspective view of the second alternate embodiment.

FIG. 21 is a bottom plan view of a second alternate embodiment. The damping mechanism is substantially the same as the embodiment described in FIG. 15, with the exception that only a single friction surface 78 is used. Further, groove 91 is not present in friction surface 78. Instead, arcuate surface 92, see FIG. 23, provides a continuous contact surface for damping plate 76. Since it has a relatively low coefficient of friction, normal force T generates a negligible frictional force on the damping plate. For balancing, two forces (T+P) are present. For friction, two forces $R = P_1 + P$ are also present. Since the damping plate is in static equilibrium $P_1' = -P_1$.

Figure 22:
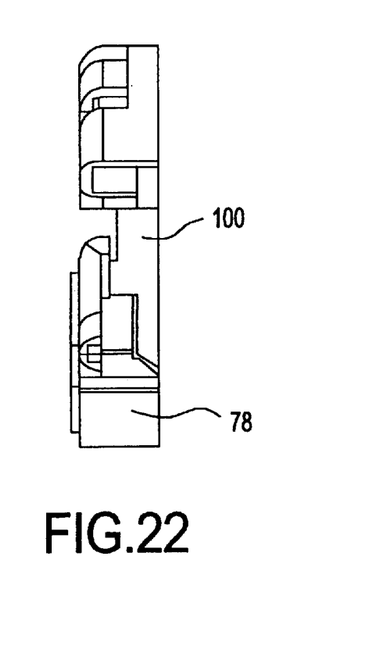
FIG. 22 is a side elevation view of the damping mechanism along line 22—22 in FIG. 21.

FIG. 22 is a side elevation view of the damping mechanism along line 22—22 in FIG. 21.

FIG. 23 is a top plan view of the second alternate embodiment. Friction surface 78 is connected to damping plate 76 by tabs 85. The portion of the damping plate shown in the other embodiments as comprising a groove adjacent contact point 107, is in this embodiment a continuous arcuate surface 92 for engaging a pivot arm.

FIG. 24 is a bottom perspective view of the second alternate embodiment. Continuous arcuate surface 92 provides a bearing surface for receiving a force T as described herein.

Figure 25:
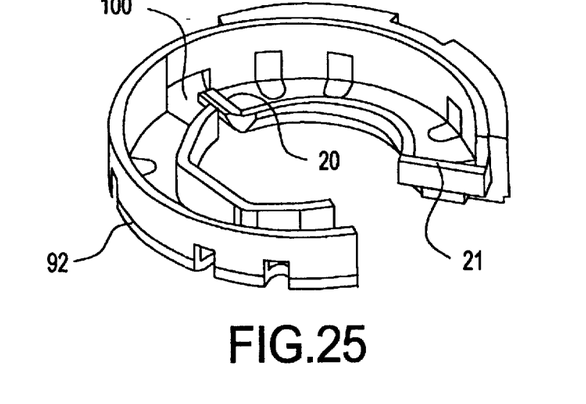
FIG. 25 is a top perspective view of the second alternate embodiment.

FIG. 25 is a top perspective view of the second alternate embodiment. Spring supports 20, 21 receive the torsional spring 50 (not shown) as well as an axial spring force described herein.

What is claimed is:

1. A damping mechanism used in a tensioner for tensioning a power transmission belt;
   a spring having first and second ends and having a spring torque;
   a damping plate having a friction surface and at least one ramp surface for engaging a pivot surface and wherein the improvement comprises;
      the damping plate includes a channel having a plate base, an inner wall and an outer wall; and
   the damping plate includes first and second spring contact points for operatively connecting the first end of the spring whereby the spring torque applied to the damping plate in combination with a reactive force at the pivot surface generates a normal force.

2. The damping mechanism as claimed in claim 1 wherein the damping plate is symmetrical about at least one axis.

3. The damping mechanism as claimed in claim 1 wherein the damping plate includes an outer friction surface.

4. The damping mechanism as claimed in claim 3 wherein the damping plate includes an attached lining that defines the outer friction surface.

5. The damping mechanism as claimed in claim 1 wherein the spring is a torsion spring.

6. The damping mechanism as claimed in claim 1 wherein the damping plate is circular.

7. The damping mechanism as claimed in claim 1 wherein the outer wall includes a deflecting band for allowing radial engagement with the tensioner.

8. The damping mechanism as claimed in claim 1 wherein the plate base includes a top surface for engagement with the spring.

9. The damping mechanism as claimed in claim 1 wherein the damping plate is semi-circular.

10. The damping mechanism as claimed in claim 9 wherein the damping plate includes a pivot joint for allowing relative motion of the damping plate.

11. The damping mechanism as claimed in claim 1 wherein the damping plate includes an inner friction surface.

12. The damping mechanism as claimed in claim 11 wherein the damping plate includes an attached lining that defines the inner friction surface.

13. The damping mechanism as claimed in claim 1 wherein the plate base includes a lower surface for sliding engagement with the tensioner.

14. The damping mechanism as claimed in claim 13 wherein the lower surface includes friction pads.

15. A belt tensioner for tensioning an endless member comprising:
   a housing having a shaft;
   a pivot arm pivotally mounted on the shaft;
   a pulley journaled to the pivot arm to rotate about an axis substantially parallel to and set apart from the shaft;
   a spring having first and second ends and having a spring torque;
   a damping plate having a friction surface and at least one ramp surface for engaging a pivot surface;
   the damping plate includes first and second spring contact points for operatively connecting the first end of the spring whereby the spring torque applied to the damping plate in combination with a reactive force at the pivot surface generates a normal force;
   the damping plate substantially attenuating all pivot arm motion by a first damping force acting on a movement of said pivot arm in a first direction away from an endless member and a second damping force acting on a movement of said pivot arm in a second direction toward an endless member, the first damping force greater than the second damping force.

16. The tensioner as in claim 1, wherein a ratio of the first damping force and the second damping force comprises a coefficient of asymmetry.

17. The tensioner as in claim 16, wherein the coefficient of asymmetry is greater than 1.

18. The tensioner as in claim 16, wherein the friction surface describes a curvilinear shape having a length.

19. The tensioner as in claim 16,
   whereby a rotation of the damping plate occurs upon application of a force to the first contact point and second contact point having the pivot surface as a center of rotation.

20. The tensioner as in claim 16, wherein the friction surface comprises at least two friction surface portions with respective center of curvature; and whereby the center of curvature of one of said at least two friction surface portions is not coincidental with an other of said at least two friction surface portions center of curvature.

21. The tensioner as in claim 16, wherein the friction surface comprises a non-metallic material.

22. The tensioner as in claim 21, wherein the non-metallic material is lubricated.

* * * * *